May 9, 1961 R. W. STOTT 2,983,511
REMOVABLE RUBBER FACED BOWLING BALL FINGER HOLE CLIP
Filed Oct. 16, 1959
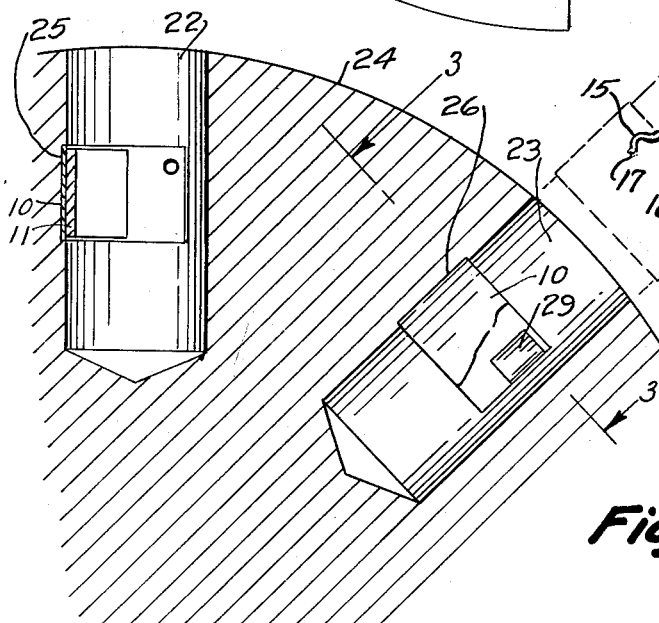
INVENTOR
ROY WALTER STOTT
BY James Harrison Bowen
ATTORNEY

United States Patent Office 2,983,511
Patented May 9, 1961

2,983,511

REMOVABLE RUBBER FACED BOWLING BALL FINGER HOLE CLIP

Roy W. Stott, 9514 S. Sacramento Ave.,
Evergreen Park 42, Ill.

Filed Oct. 16, 1959, Ser. No. 846,940

4 Claims. (Cl. 273—63)

This invention relates to friction grips for holding bowling balls to facilitate controlled discharge of the ball in the final swing, and in particular spring clips having a friction lining or facing on inner surfaces positioned in counterbores of finger gripping holes of bowling balls whereby a bowler has absolute control of a ball, and wherein the friction lining or facing is readily replaceable.

The purpose of this invention is to provide a friction gripping facing for finger gripping holes of bowling balls in which the facing is readily removed and replaced.

Various attempts have been made to use inserts with rubber linings in openings of bowling balls, and other attempts have been made to install gripping elements on bowling balls. However, with conventional types of friction facings or linings the friction material wears and cannot be replaced, and where gripping elements are used it is difficult to retain balance of the ball.

With these thoughts in mind this invention contemplates a spring clip of arcuate formation and having a facing of friction material, such as rubber, positioned in a counterbore in a finger opening of a bowling ball whereby positive gripping means is provided in the ball.

The object of this invention is to provide friction gripping means in finger holes of bowling balls in which the gripping means is readily replaceable.

Another object of the invention is to provide friction gripping means in finger receiving openings of bowling balls without interfering with the balance of the ball.

Another important object of the invention is to provide friction gripping means in finger openings of bowling balls in which the gripping means may be installed in balls now in use.

A further object of the invention is to provide means for installing friction gripping means in finger openings of bowling balls in which the possibility of the gripping means being accidentally displaced while the ball is in use is substantially negligible.

A still further object of the invention is to provide a removable rubber faced bowling ball finger hole clip which is of a simple and economical construction.

With these and other objects and advantages in view the invention embodies an arcuate band of spring material and having a lining or facing of friction material, such as rubber, and a pair of gripping tongs for removing and replacing the band.

Other features and advantages of the invention will appear from the following description taken in connection with the drawings, wherein:

Figure 1 is a view showing the rubber faced bowling ball spring clip.

Figure 2 is a cross section through a portion of a bowling ball showing finger gripping openings in the ball, and illustrating the arrangement of the clip in the ball, the spring clips being positioned in counterbores, and an end of one of the clips being broken away to show a recess in the ball behind the clip for receiving a prong of a pair of tongs for inserting and removing the clips.

Figure 3 is a cross section taken on line 3—3 of Figure 2 showing a friction clip installed in a bowling ball.

Figure 4 is a view showing a pair of tongs for removing and replacing the friction gripping elements.

Figure 5 is a view showing a drill head or reamer for cutting the counterbores in which the spring clips are positioned in the bowling balls.

Figure 6 is a sectional plan showing a modification wherein a friction pad of rubber or the like is flush with the inner surface of the finger receiving hole of a ball, whereby the friction facing or pad does not protrude into the hole.

Referring now to the drawings wherein like reference characters denote corresponding parts the removable rubber faced bowling ball finger hole spring clips of this invention include an arcuate band of spring material, as indicated by the numeral 10, a friction pad 11, of rubber or other suitable material, and a pair of tongs 12 for inserting and removing the friction clips.

Elongated openings 13 and 14, which extend through the band are spaced inwardly from ends of the spring band, and the openings are positioned to receive knobs 15 and 16 on ends 17 and 18 of arms 19 and 20 of the grippers or tongs 12. The arms of the tongs are connected by an arcuate portion 21 at the closed end of the tongs.

Finger receiving openings 22 and 23 of a bowling ball 24 are provided with counterbores 25 and 26 which extend from points 27 to points 28, as shown in Figure 3, and the spring bands 10 are positioned in the counterbores. The ball is also provided with recesses 29 and 30, which are drilled by similar, although smaller, drill heads or reamers, as shown in Figure 5, and these recesses are positioned in registering relation with the openings 13 and 14, so that the knobs 15 and 16 of the tongs may extend through the openings to facilitate gripping the band in inserting and removing the spring clips.

The counterbores 25 and 26 may be formed by a drill cutter head or reamer 31 on a shank 32 extended from a chuck 33 of a machine tool, or by other suitable means.

In the design shown in Figure 6 a hole or finger receiving opening 34, similar to the openings 22 and 23, of a bowling ball 35, is provided with a continuous counterbore 36 in which a spring band 37 is positioned; and the spring band is provided with a rubber facing 38 that is flush with the inner surface of the opening 34. In this design the exposed surface of the friction or rubber facing is within the limits of the inner surface of the finger receiving opening and does not protrude into the opening of the ball.

Although the facing, lining, or friction pad 11 is designated as being made of rubber it will be understood that it may be made of plastic or other suitable material.

The clip is inserted by contracting the ends of the band 10 with the knobs 15 and 16 in the openings 13 and 14, respectively, and sliding the band into the counterbores 26 or 36. The spring clip will snap into the counterbores and the friction lining will be exposed for engagement with the tips of the fingers, whereby absolute control of the ball is obtained.

As the lining wears the spring clips may be removed and resurfaced, or the worn clips may be replaced with new clips.

The length, width, and thickness of the band or facing may be varied as desired.

The spring clip or band may be removed and replaced by other means.

It will be understood that other modifications, within the scope of the appended claims, may be made in the design and arrangement of the parts without departing from the spirit of the invention.

Having now described the invention that which is claimed to be new and desired to be procured by Letters Patent is:

1. In a bowling ball, the combination which comprises a sphere having spaced finger receiving openings therein and having counterbores in said openings, and an arcuate spring clip having a friction lining on its inner surface positioned in the counterbore of each of said openings providing friction gripping means, and the depth of the counterbores being equal to the thickness of the spring clip whereby the inner surface of the arcuate spring clip is flush with the inner surface of said opening, the ends of the arcuate spring clip being provided with inwardly spaced openings for receiving prongs of a pair of tongs for removing the clip from the opening of a bowling ball and also for replacing the clip in said counterbore of the opening.

2. In a bowling ball, the combination which comprises a sphere having spaced finger receiving openings therein and having counterbores in said openings, the counterbores being positioned midway between inner and outer ends of said openings, and an arcuate spring clip having a friction lining on its inner face and having openings spaced inwardly from the ends positioned in each of said counterbores.

3. A bowling ball as described in claim 2, in which the thickness of the spring clips is equal to the depth of the counterbores whereby the inner surface of the spring clip is flush with the inner surface of the finger receiving opening.

4. A bowling ball as described in claim 2, wherein the openings in the ends of the spring clip are elongated and spaced inwardly from one edge thereof.

References Cited in the file of this patent

UNITED STATES PATENTS

| | | |
|---|---|---|
| 626,584 | Wilmerling | June 6, 1899 |
| 1,021,490 | Scully | Mar. 26, 1912 |
| 2,475,876 | Campi | July 12, 1949 |
| 2,859,039 | Jerome | Nov. 4, 1958 |